(12) United States Patent
Pickover et al.

(10) Patent No.: US 11,561,109 B2
(45) Date of Patent: Jan. 24, 2023

(54) ROUTE ACCESSIBILITY FOR USERS OF MOBILITY ASSISTIVE TECHNOLOGY

(71) Applicant: International Business Machines Corporation, Armonk, NY (US)

(72) Inventors: Clifford A. Pickover, Yorktown Heights, NY (US); Aisha Walcott, Nairobi (KE); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 1104 days.

(21) Appl. No.: 15/651,368

(22) Filed: Jul. 17, 2017

(65) Prior Publication Data

US 2019/0017835 A1 Jan. 17, 2019

(51) Int. Cl.
*G06N 5/04* (2006.01)
*G01C 21/34* (2006.01)
*G06F 16/29* (2019.01)
*G06N 5/00* (2006.01)
*G06N 20/00* (2019.01)

(52) U.S. Cl.
CPC ......... *G01C 21/3484* (2013.01); *G06F 16/29* (2019.01); *G06N 5/003* (2013.01); *G06N 5/04* (2013.01); *G06N 20/00* (2019.01)

(58) Field of Classification Search
CPC .......... G06F 16/29; G06N 5/003; G06N 5/04; G06N 20/00; G01C 21/3484
See application file for complete search history.

(56) References Cited

U.S. PATENT DOCUMENTS

| 6,321,158 | B1 | 11/2001 | DeLorme et al. |
| 6,622,084 | B2 | 9/2003 | Cardno et al. |
| 7,894,984 | B2 | 2/2011 | Rasmussen et al. |
| 7,920,967 | B1 | 4/2011 | Harris et al. |

(Continued)

FOREIGN PATENT DOCUMENTS

| CN | 107273502 A | * 10/2017 |
| EP | 2851825 A2 | 3/2015 |

OTHER PUBLICATIONS

Li, Jiyi. "Map route ranking with weighted distance using environmental factors." arXiv preprint arXiv:1404.0934 (2014). (Year: 2014).*

(Continued)

*Primary Examiner* — Casey R. Garner
(74) *Attorney, Agent, or Firm* — Barak Cohen; Ryan, Mason & Lewis, LLP (57) ABSTRACT

A database comprising data associated with one or more routes is maintained. The data associated with the one or more routes comprises difficulty level data for utilizing one or more mobility assistive tools to traverse the one or more routes. In response to receiving a query from a given computing device, one or more amounts of physical exertion for a given user to traverse at least a portion of the one or more routes utilizing a given mobility assistive tool are predicted. One or more routes for the given user to traverse are selected based at least in part on the predicted amounts of physical exertion. One or more contextual factors of the given user are estimated to at least one of optimize and prioritize the selected one or more routes for the given user based on analyzing user data.

20 Claims, 6 Drawing Sheets

(56) References Cited

U.S. PATENT DOCUMENTS

| | | | |
|---|---|---|---|
| 8,090,532 | B2 | 1/2012 | Tashev et al. |
| 8,340,633 | B1 | 12/2012 | Rege et al. |
| 8,712,684 | B2 | 4/2014 | Van Hende |
| 9,046,370 | B2 | 6/2015 | Annapureddy et al. |
| 9,142,141 | B2 | 9/2015 | Yeh et al. |
| 9,217,649 | B1* | 12/2015 | Dror ............... G01C 21/3617 |
| 9,579,543 | B1* | 2/2017 | Yoo .................. G06F 3/1204 |
| 9,741,021 | B2 | 8/2017 | Yu et al. |
| 2002/0077749 | A1* | 6/2002 | Doi .................... G01C 21/20 |
| | | | 701/433 |
| 2006/0146719 | A1 | 7/2006 | Sobek et al. |
| 2007/0299599 | A1 | 12/2007 | Letchner et al. |
| 2011/0238291 | A1* | 9/2011 | Bach ..................... A61H 3/04 |
| | | | 701/533 |
| 2011/0320275 | A1 | 12/2011 | O'Sullivan et al. |
| 2012/0143497 | A1 | 6/2012 | Van Hende |
| 2012/0239288 | A1 | 9/2012 | Forutanpour et al. |
| 2012/0265433 | A1 | 10/2012 | Viola et al. |
| 2015/0330787 | A1* | 11/2015 | Cioffi .................... G01C 21/00 |
| | | | 701/537 |
| 2015/0330800 | A1 | 11/2015 | Huyi |
| 2016/0320937 | A1* | 11/2016 | Zhou ................. G06F 3/0482 |
| 2017/0213273 | A1* | 7/2017 | Dietrich ............ G01C 21/3461 |
| 2018/0211337 | A1* | 7/2018 | Ghaddar ............ G01C 21/3423 |
| 2018/0348010 | A1* | 12/2018 | Coleman ........... G01C 21/3446 |

OTHER PUBLICATIONS

Wikipedia, "Wheelmap.org," https://en.wikipedia.org/wiki/Wheelmap.org, May 22, 2016, 4 pages.

G.F. Dunton et al., "Development of a Smartphone Application to Measure Physical Activity Using Sensor-Assisted Self-Report," Frontiers in Public Health, Feb. 28, 2014, pp. 1-13, vol. 2, No. 12.

M. Jakob et al., "Personalized Fully Multimodal Journey Planner," External Credit Assessment Institutions (ECAI), 2014, pp. 1225-1226.

B. Yang et al., "Toward Personalized, Context-Aware Routing," The International Journal on Very Large Data Bases (VLDB), Apr. 2015, pp. 297-318, vol. 24, No. 2.

L. McGinty et al., "TURAS: a Personalized Route Planning System," Proceedings of the 6th Pacific Rim International Conference on Artificial Intelligence (PRICAI), Lecture Notes in Computer Science, 2000, pp. 791, vol. 1886.

J. Letchner et al., "Trip Router with Individualized Preferences (TRIP): Incorporating Personalization into Route Planning," Proceedings of the 18th Conference on Innovative Applications of Artificial Intelligence (IAAI), Jan. 2006, pp. 1795-1800, vol. 2.

* cited by examiner

ROUTE ACCESSIBILITY FOR USERS OF MOBILITY ASSISTIVE TECHNOLOGY

BACKGROUND

For mobility impaired individuals such as individuals who are physically limited in some manner, mobility assistive tools may be used to provide mobility assistance. Examples of mobility assistive tools include, but are not limited to, walkers, wheelchairs, and canes. However, the ability to traverse a route (e.g., a sidewalk) may be difficult if not impossible due to obstruction, such as construction or other sources of blockage, or may be challenging due to the geography and terrain of the route, such as due to incline and/or the material comprising the walking route (e.g., gravel, dirt, tarmac, etc.) and other contextual characteristics and/or factors (e.g., user cognitive or affective state, weather condition, visibility, etc.). Such potential sources of problems may greatly impact movement for mobility impaired individuals. For example, a wheelchair user may not be able to navigate up a ramp with large cracks in it, and the additional physical energy required to take a given detour may be a deterrent for the wheelchair user.

SUMMARY

Embodiments of the invention provide techniques for the generation of personalized routes for users of mobility assistive tools. In particular, embodiments of the invention provide techniques for dynamically recommending routes to users of mobility assistive tools.

For example, in one embodiment, a method for generating personalized routes for users of mobility assistive tools comprises maintaining a database comprising data associated with one or more routes. The data associated with the one or more routes comprises difficulty level data for utilizing one or more mobility assistive tools to traverse the one or more routes. In response to receiving a query from a given computing device, one or more amounts of physical exertion for a given user to traverse at least a portion of the one or more routes utilizing a given mobility assistive tool are predicted. One or more routes for the given user to traverse are selected based at least in part on the predicted amounts of physical exertion. One or more contextual factors of the given user may be estimated to at least one of optimize and prioritize the selected one or more routes for the given user based on analyzing user data. The steps are implemented by at least one processing device comprising a processor operatively coupled to memory.

For example, in another embodiment, an article of manufacture for generating personalized routes for users of mobility assistive tools comprises a processor-readable storage medium for storing processor-readable program code which, when executed, causes a processor to implement the steps of maintaining a database comprising data associated with one or more routes. The data associated with the one or more routes comprises difficulty level data for utilizing one or more mobility assistive tools to traverse the one or more routes. In response to receiving a query from a given computing device, one or more amounts of physical exertion for a given user to traverse at least a portion of the one or more routes utilizing a given mobility assistive tool are predicted. One or more routes for the given user to traverse are selected based at least in part on the predicted amounts of physical exertion. One or more contextual factors of the given user may be estimated to at least one of optimize and prioritize the selected one or more routes for the given user based on analyzing user data.

For example, in yet another embodiment, a system to generate personalized routes for users of mobility assistive tools comprises a data store configured to maintain a database comprising data associated with one or more routes. The data associated with the one or more routes comprises difficulty level data for utilizing one or more mobility assistive tools to traverse the one or more routes. The system further comprises at least one processing device operatively coupled to the data store and configured to, in response to receipt of a query from a given computing device, predict one or more amounts of physical exertion for a given user to traverse at least a portion of the one or more routes utilizing a given mobility assistive tool, and select one or more routes for the given user to traverse based at least in part on the predicted amounts of physical exertion. One or more contextual factors of the given user may be estimated to at least one of optimize and prioritize the selected one or more routes for the given user based on analyzing user data.

By way of further example, in one or more illustrative embodiments, the computing device from which the query is received may comprise a given client device (e.g., mobile phone, smartwatch, etc.) associated with a given user and/or one or more nearby computing or communication devices (e.g., Wi-Fi gateways, beacon, network devices, nearby mobile devices, etc.) associated with a given location. Still further, in one or more illustrative embodiments, the step of maintaining a database comprises maintaining data associated with one or more routes linked with contextual characteristics and/or factors (e.g., weather condition, visibility, etc.). The data associated with the one or more routes may comprise difficulty level data for utilizing one or more mobility assistive tools to traverse the one or more routes under given contextual factors of the user, environment, location, etc.

These and other exemplary embodiments of the invention will be described in or become apparent from the following detailed description of exemplary embodiments, which is to be read in connection with the accompanying drawings.

DETAILED DESCRIPTION

Illustrative embodiments of the invention may be described herein in the context of illustrative methods, systems and devices for generation of personalized routes for one or more users. In particular, illustrative embodiments of the invention provide for generation of personalized routes associated with improving the well-being of a person, such as mental health, physical health, and/or cognitive/affective state of the person. The routes may be optimized for a given user based on personal goals such that there is an incentive for the given user to select a particular route (e.g., an incentivized route). However, it is to be understood that embodiments of the invention are not limited to the illustrative methods, systems and devices but instead are more broadly applicable to other suitable methods, systems and devices.

A route may be defined as a way or course taken in travelling from a starting point to a destination point. Conventional user-centric approaches for route generation suffer from a number of disadvantages. While these user-centric approaches may provide recommended routes, such solutions typically do not adequately provide route personalization for users of various mobility assistive tools under given contextual factors of the user, environment, or location. The user contextual factors (e.g., cognitive state, affective state, or cohort) may be used to optimize and/or prioritize generated route recommendation. The contextual factors may be estimated, for example, using custom machine learning and statistical algorithms that use a plurality of user data inferred from the user computing device such as smartwatch, fitness data tracking device, mobile phone built-in sensor (e.g., global positioning system (GPS), accelerometer, camera, microphone, social network connections), user historical activity data, etc.

As used herein, mobility assistive tools refer to tools or devices used to assist mobility impaired individuals. Mobility assistive tools may include, for example, manually propelled wheelchairs (i.e., propelled by hand) and electrically propelled wheelchairs (e.g., motorized wheelchairs). Electrically propelled wheelchairs may be controlled by, for example, actuators through a joystick or sip-and-puff (SNP) assistive technology. SNP assistive technology utilizes air pressure generated by inhaling or exhaling through a tube to control the wheelchair, and is designed for individuals who are unable to use their hands to manually propel the wheelchair and/or use a joystick to operate a motorized wheelchair. Other examples of mobility assistive tools may include, for example, walkers or walking frames, prosthetic limbs, canes, crutches, and miscellaneous mobility supporting tools (e.g., splints, braces, orthotics, restraints and supports).

Figure 1:
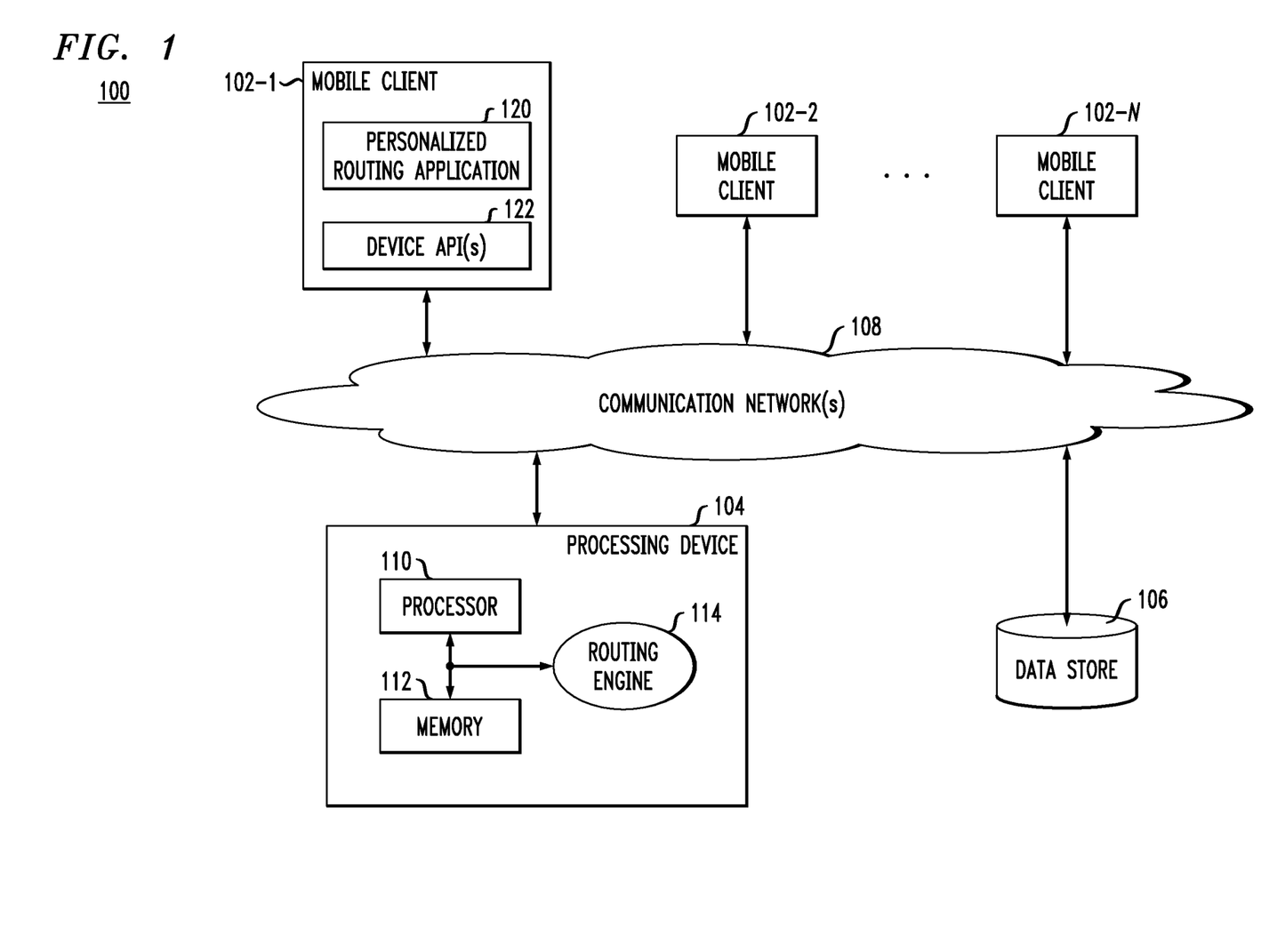
FIG. 1 depicts a system for generating personalized routes for one or more users, according to an embodiment of the invention.

FIG. 1 shows a system 100 configured to generate route recommendations for one or more users of mobility assistive tools. System 100 may include one or more mobile clients associated with one or more users, shown in FIG. 1 as mobile clients 102-1, 102-2, . . . , 102-N, at least one processing device 104, and data store 106, all connected over at least one communications network 108. It is to be understood that descriptions herein with respect to functions and operations of mobile client 102-1 also apply to mobile clients 102-2, . . . , 102-N.

Mobile client 102-1 is configured to communicate with processing device 104 for personalized routing services for a given user. Mobile client 102-1 is configured to continuously and dynamically monitor, sense, and/or learn about a route being traversed by the given user. In one embodiment, mobile client 102-1 is configured to learn about activities of the given user while traversing a route. Mobile client 102-1 may be, for example, a sensor, a mobile device, an unmanned aerial vehicle, etc. In one embodiment, mobile client 102-1 is configured to be mounted on the mobility assistive tool being utilized by its respective user. In another embodiment, mobile client 102-1 is configured to be possessed by the given user. For example, mobile client 102-1 may be located within a pocket of the given user.

Processing device 104 is shown comprising processor 110 operatively coupled to memory 112, and routing engine 114 operatively coupled to processor 110 and memory 112. In one embodiment, processing device 104 is a server, such as a cloud-based server. Processing device 104 is configured to collect data from various sources, such as data store 106, for use in various analytics relating to generation of personalized routes for particular users (e.g., users that utilize mobility assistive tools). Processing device 104 may itself be a collection of multiple processing devices. For example, different engines and modules of processing device 104, which will be described in detail below, may be provided by different servers or other processing devices in one or more multiple clouds or other computing platform arrangements. In addition, it is to be appreciated that embodiments do not require use of clouds or cloud-based servers.

Data store 106 may be, by way of example, a repository for maintaining data used to generate route selections and recommendations for one or more users of mobility assistive tools. For example, in one embodiment, data store 106 maintains a database comprising data associated with one or more routes. The data associated with the one or more routes may comprise difficulty level and/or exertion level parameters. For example, the difficulty level parameters may include difficulty level parameters for utilizing one or more mobility assistive tools to traverse the one or more routes. Although FIG. 1 shows only a single data store 106, embodiments are not so limited. In other embodiments, processing device 104 may collect and exchange data with multiple distinct data stores or other data sources.

As shown in FIG. 1, mobile clients 102-1 through 102-N are configured for communication with processing device 104 over communications network(s) 108 for personalized routing services. Communications network(s) 108 may comprise one or more wireless and/or wired networks. Embodiments, however, are not limited solely to arrangements in which mobile clients 102-1 through 102-N communicate with processing device 104. Instead, other embodiments may include other types of clients, such as desktop clients, also configured for communication with the cloud-based servers over one or more wired and/or wireless networks. For example, in some embodiments, a user may register to receive personalized routing services via a desktop client, but choose to receive notifications regarding personalized routes at one or more mobile clients to which the user has access.

Mobile clients 102-1 through 102-N are configured to communicate with processing device 104 in order to receive personalized routes for users of the mobile clients 102. FIG. 1, for example, shows mobile client 102-1 comprising personalized routing application 120 and one or more device application programming interfaces (APIs) 122 to facilitate communication with processing device 104. Although not specifically shown in FIG. 1, each of the other mobile clients 102-2 through 102-N may also include similar personalized routing applications and/or device APIs for facilitating communication with processing device 104.

In some embodiments, personalized routing application 120 provides user interface functionality permitting the given user associated with mobile client 102-1 to register with processing device 104 to receive personalized routes, or to request a particular personalized route between a source and a destination. Device API(s) 122 may be used to select a current location of mobile client 102-1 as the source of such a request, utilizing location sensors such as GPS sensors (not shown) that may be embedded in mobile client 102-1. Cellular or other wireless networking information may also or alternatively be utilized by device API(s) 122 to determine a current location of mobile client 102-1 to utilize as the source for the personalized route. In other embodiments, user interface features of personalized routing application 120 permit the user to specify the source as well as the destination for a requested personalized route under given contextual factors of the user, environment, or location. The user contextual factors (e.g., cognitive state, affective state, or cohort) may be used to optimize and/or prioritize generated route recommendations.

In response to receiving a query from, for example, mobile device 102-1, routing engine 114 is configured to select at least one route for the given user associated with mobile device 102-1 from the database maintained in data store 106. Selecting the at least one route comprises predicting an amount of physical exertion for the user to traverse at least a portion of the one or more routes utilizing a given mobility assistive tool associated with the given user. The amount of physical exertion for the given user is predicted at least in part by utilizing the difficulty level data. In one embodiment, predicting the amount of physical exertion comprises utilizing crowdsourced data. The crowdsourced data may comprise physical exertion data for one or more other users, such as users associated with mobile clients 102-2, ..., 102-N. In one embodiment, selecting the at least one route further comprises providing the given user with a mobility assistive tool recommendation for traversing the at least one or more selected routes. In one embodiment, selecting the at least one route further comprises optimizing and prioritizing of the recommended at least one or more selected routes. The optimizing and prioritizing of the selected routes for the given user is determined at least in part by utilizing custom machine learning and statistical algorithms on a plurality of user data inferred from the user computing device such as a smartwatch, a fitness data tracking device, a mobile phone built-in sensor (e.g., GPS, accelerometer, camera, microphone, social network connections), user historical activity data, etc. In one embodiment, selecting the at least one route further comprises presenting the optimized and/or prioritized routes on the user preferred mode, such as on a graphical user interface (GUI) of the user device (e.g., mobile phone) or on GUI of the mobility assistive tool in the form of visual and/or audio.

Additional data may be utilized by routing engine 114 to predict the amount of physical exertion for the user. For example, routing engine 114 may utilize data associated with one or more personalized goals of the user. One personalized goal may be a personalized fitness goal for the user, which may be a desired amount of physical activity that the user wishes to perform during the day. Thus, it may not be optimal to select a route that minimizes physical exertion for the user if such a selection runs contrary to the personalized fitness goal for the given user. Other examples of personalized goals may include, for example, destination goals, such as having to attend a business meeting, or having to visit a friend. Such personalized goals may advantageously be incorporated into the route determination process to provide incentivized routes in real-time or near real-time. In one embodiment, a graphical user interface (GUI) is provided as part of the mobile client and configured to allow the given user to interactively set and specify the one or more personalized goals. Accordingly, routing engine 114 is configured to correlate various sources of data in selecting at least one route for the given user.

In one embodiment, determining the difficulty level data comprises performing an analysis of one or more geographic characteristics of the one or more routes. Performing the analysis of the one or more geographic characteristics of the one or more routes may include, for each route, detecting and characterizing material composing the route, calculating an elevation of each route, analyzing each route for faults, and/or analyzing weather conditions associated with each route. The analysis of the one or more geographic characteristics may be performed at least in part by one or more neural networks implemented by processing device 104. For example, visual analytic and deep neural networks may be used to identify cracks in pavement, textures, holes, step height, ramp steepness, ice, etc.

The database maintained in data store 106 may include a plurality of dimensions. The plurality of dimensions may include, for example, a mobility assistive tools used dimension, an "other characteristics" dimension, and a user conditions dimension. The mobility assistive tool used dimension includes data related to mobility assistive tools. The other characteristics dimension includes data relating to miscellaneous data associated with a user. For example, the other characteristics dimension may comprise data including, but not limited to, data indicating whether the user is traveling alone or with a caregiver/aid, physical characteristics of the user that may affect route traversal (e.g., height and weight), cognition data (e.g., familiarity with the route(s)), accident history data, injury type data, and data specifying whether the user utilizes a guide animal to travel. The user conditions dimension may include cohorts such as early stages of various physical and mental diseases and conditions.

Crowd pressure may be another parameter considered in route selection. In one embodiment, crowd pressure is calculated as crowd density multiplied by the variance of speeds of moving people. High crowd pressures can be dangerous and may even lead to stampede or stampede-like conditions. Accordingly, routing engine 114 may be configured to eliminate routes determined to have high crowd pressures from being considered for selection.

Another parameter that may be considered in route selection is time. Time constraints may limit the routes that may be selected for the user. As an illustrative example, time constraints may be determined based on extracting data from an electronic calendar associated with the user.

Thus, routes may be characterized based on a multi-dimensional array that contains parameters related to for example, one or more of assistive devices, movement disorder categories, physical and mental characteristics of the user, accident history, injury type, crowd pressure computations, and various other considerations.

In one embodiment, the difficulty level of a route is computed by processing device 104 via one or more machine learning and signal processing processes. The machine learning and signal processing processes may analyze signal signatures from mobile client 102-1 while the given user is moving. These learning processes may identify general formats of sensor signals that automatically classify the mobility assistive tool used by the given user. More specifically, as the given user uses different mobility assistive tools, anomaly detection may be applied to determine and geo-locate one or more areas that require the given user to change his or her preferred or otherwise current mobility assistive tool.

In one embodiment, processing device 104 is configured to build an accessibility map from various data sources. The given user may be permitted to interact with the accessibility map via an interactive graphical user interface (GUI). For example, if the given user feels like he or she can handle a higher difficulty level on a particular day, the given user may indicate a desire to decrease trip time, even if that results in more physical exertion. The accessibility map may be color coded or otherwise coded (which may change based on real-time information) to indicate routes with difficulties according to different cohorts (e.g., wheelchair, Parkinson's, sprained ankle, etc.), and the given user may communicate with processing device 104 via the GUI in order to meet the given user's cohort needs or to specify cohort needs.

In one embodiment, processing device 104 is configured to receive feedback from the given user after traversing the route in real-time or near real-time. This feedback may be used to adjust the difficulty level data and/or monitor activity. The difficulty level data may be compiled over time so that other users may benefit from the data. This feedback may be used to develop a personalized content-based recommender to associate physical exertion of the given user with one or more mobility mode sensor signatures. Using the recommender ranking between mobility assistive tools, sensor signals and physical exertion, routes may be ranked and labeled based on the personalized goals from similar cohorts (e.g., by collaborative filtering from multiple users).

In one embodiment, system 100 is configured to automatically maintain one or more up-to-date accessible infrastructure maps (e.g., sidewalks in cities). Infrastructure segments may be dynamically labeled based on mobility mode (e.g., labeling a segment as accessible for bicycles, but not for roller skates), while enabling users with mobility needs to maintain up-to-date routes for moving around urban or non-urban settings. The type of exercise required to complete a journey may be fetched from a corresponding accessibility map.

System 100 may be further configured to assist in city planning with alternative transport options. Additionally, system 100 may be further configured to aid in tourism by providing personal route and travel planning features for tourists (e.g., parking, hotel selection, etc.).

System 100 may be further configured to acquire recorded exercise data of an exercise performed by the user, and may display the exercise data as a function of the location data on a display. For example, the display may include the map as a background, and an avatar associated with the user automatically moves along the map based on location data (e.g., GPS data) acquired from mobile client 102-1 in order to determine a location of the user. In one embodiment, one or more graphics or sounds associated with the avatar are generated on mobile client 102-1. For example, if the avatar is doing well traversing the route, a motivational sound or graphic such as "great job!" may be generated on mobile client 102-1. Additionally, the mobility assistive tool may be configured to provide motivational support while traversing the route. For example, if the mobility assistive tool is a wheelchair, the wheelchair may be configured to vibrate to inform the user of his or her good progress and thus provide some motivational support to continue traversing the route.

Figure 2:
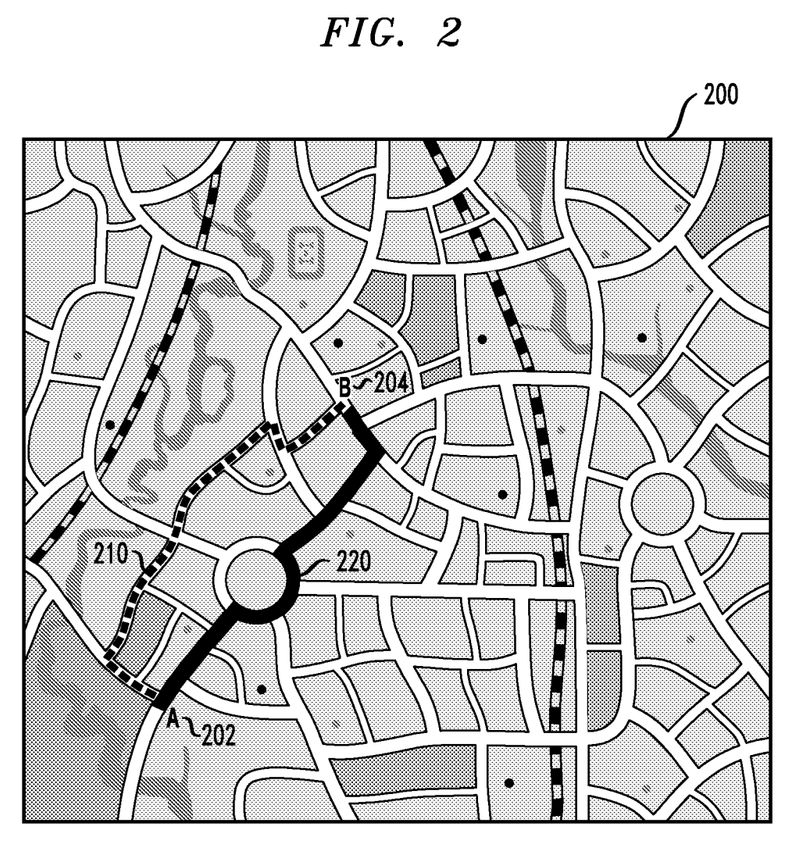
FIG. 2 depicts an accessibility map, according to an embodiment of the invention.

An example of an accessibility map is illustrated in FIG. 2. In illustrative map 200, two paths or routes 210 and 220 are shown connecting point A 202 to point B 204 are shown. Although only two routes 210 and 220 are shown in this illustrative example, the number of routes should not be considered limiting. Routes 210 and 220 may each have at least one associated difficulty level, which may be used to measure or predict a physical exertion for a user, as discussed above in FIG. 1. In one embodiment, routes 210 and 220 may have separate difficulty levels corresponding to how difficult it would be for respective mobility assistive tools to traverse each of the routes. For example, routes 210 and 220 may each have respective difficulty levels associated with traversing each of the routes 210 and 220 via wheelchair, difficulty levels associated with traversing each of the routes 210 and 220 via crutches, difficulty levels associated with traversing each of the routes 210 and 220 without mobility assistive technology, etc. The difficulty levels may be dynamically modified, such as via machine learning or statistical algorithms, in order to more accurately assess the difficulty levels.

For a given user who wants to traverse a route from point A 202 to point B 204, one of the routes 210 and 220 may be selected for the user based on the measured or predicted physical exertion of the given user. For example, if the given user utilizes a manually powered wheelchair as a mobility assistive tool, the route determined to have the lower measured or predicted physical exertion may be selected. However, if the given user indicates that they would like to exert more effort (e.g., exercise), the route determined to have the higher measured to predicted physical exertion may be selected. In one embodiment, a mobility assistive tool recommendation to traverse one of the paths may be generated. For example, if it is determined that at least one of the routes 210 and 220 has a very high difficulty level associated with utilizing a manually powered wheelchair (e.g., very coarse ground), a recommendation to utilize a different mobility assistive tool to get from point A to point B may be generated and optimized for the at least one route.

As discussed above in FIG. 1, other parameters may be considered in the selection of routes, including but not limited to, crowd pressure, time constraints, accident history, in addition to the other contextual characteristics and/or factors of the user, environment or location. Additionally, accessibility map 200 may be color coded or otherwise coded (which may change based on real-time information) to indicate routes, such as routes 210 and 220, with difficulties according to different cohorts (e.g., wheelchair, Parkinson's, sprained ankle, etc.).

Figure 3:
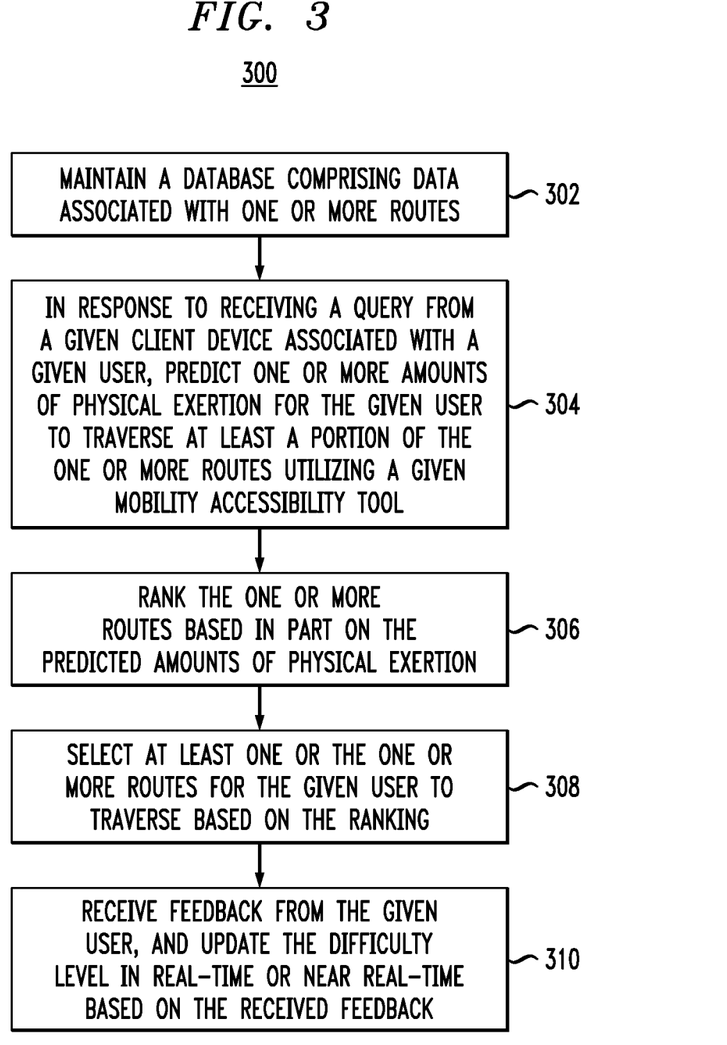
FIG. 3 depicts a flowchart illustrating an exemplary process for generating route recommendations for one or more users of mobility assistive tools, according to an embodiment of the invention.

With reference to FIG. 3, flow chart 300 is provided illustrating a process for generating route recommendations for one or more users of mobility assistive tools. At step 302, a database comprising data associated with one or more routes is maintained. At step 304, in response to receiving a query from a given client device associated with a given user, one or more amounts of physical exertion for the given user to traverse at least a portion of the one or more routes utilizing a given mobility assistive tool are predicted. At step 306, the one or more routes are ranked and, at step 308, at least one of the one or more routes is selected for the given user to traverse based on the ranking. At step 310, feedback may be received from the given user traversing a given route, and the difficulty level for the given route may be updated in real-time or near real-time based on the received feedback.

Accordingly, one or more embodiments take into consideration the precise nature of the mobility assistive technology being used, and use this information to estimate physical exertion/difficulty for different routes. For example, if the wheelchair front wheel and fork characteristics are known, a different level of exertion would be needed for different routes and sidewalk conditions if the wheel were six inches in diameter compared to a wheel that is eight inches in diameter. Also, a person's disability, and state of disability, can be be used to estimate exertion. Various rules and functions can be used to estimate difficulty/exertion for paths. By way of one non-limiting example only: estimated difficulty/exertion level=function_of (length of unpaved route segments, number of deep cracks in sidewalk, reports of difficulty levels from previous traversers of route, front-wheel diameter of wheel chair, user disease state, user's familiarity with route).

At least some of the precise information regarding the route (e.g., cracks in sidewalk, etc.) can be based on known methods, including crowd source reports, unmanned aerial vehicle flybys that analyze video of routes, video analysis from cameras on wheel chairs that traversed routes in the recent past, data from municipalities, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
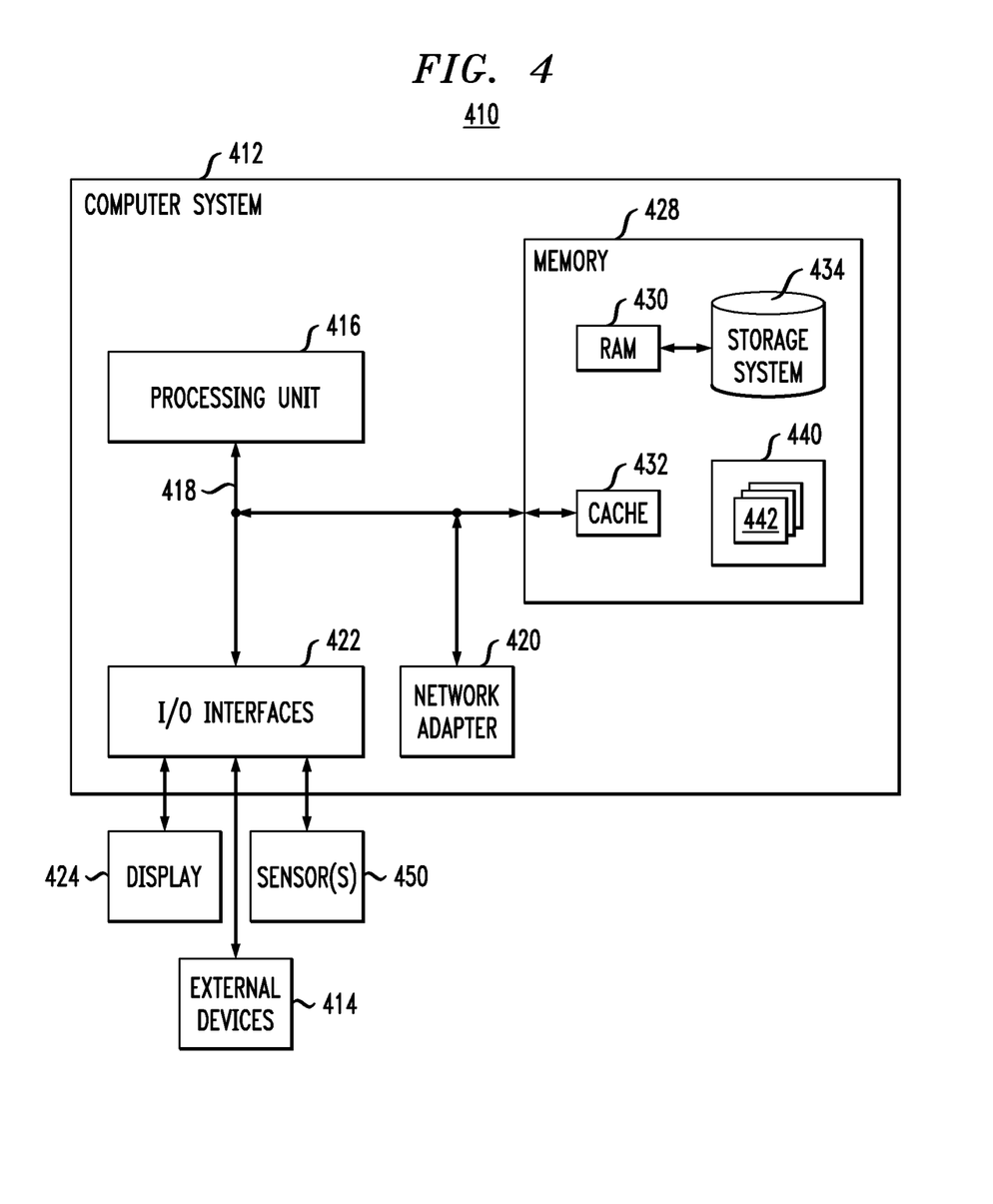
FIG. 4 depicts a computer system in accordance with which one or more components/steps of techniques of the invention may be implemented, according to an embodiment of the invention.

One or more embodiments can make use of software running on a general-purpose computer or workstation. With reference to FIG. 4, in a computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 412 typically includes a variety of computer system readable media. Such media may be any available media that is accessible by computer system/server 412, and it includes both volatile and non-volatile media, removable and non-removable media.

The system memory 428 can include computer system readable media in the form of volatile memory, such as random access memory (RAM) 430 and/or cache memory 432. The computer system/server 412 may further include other removable/non-removable, volatile/nonvolatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As depicted and described herein, the memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc., sensor(s) 450, etc., one or more devices that enable a user to interact with computer system/server 412, and/or any devices (e.g., network card, modem, etc.) that enable computer system/server 412 to communicate with one or more other computing devices. Such communication can occur via I/O interfaces 422. Still yet, computer system/server 412 can communicate with one or more networks such as a LAN, a general WAN, and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples include, but are not limited to, microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
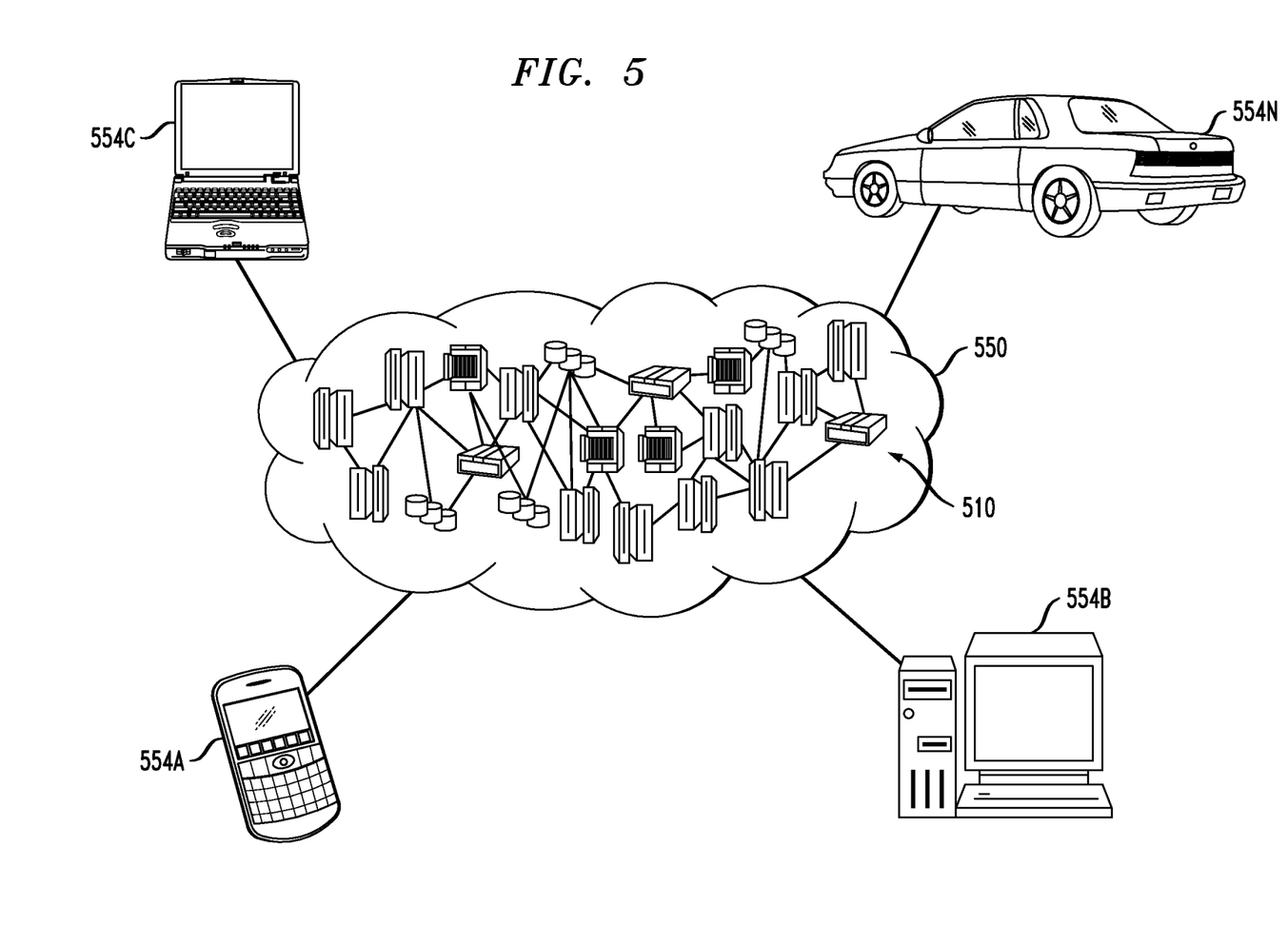
FIG. 5 depicts a cloud computing environment, according to an embodiment of the invention.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
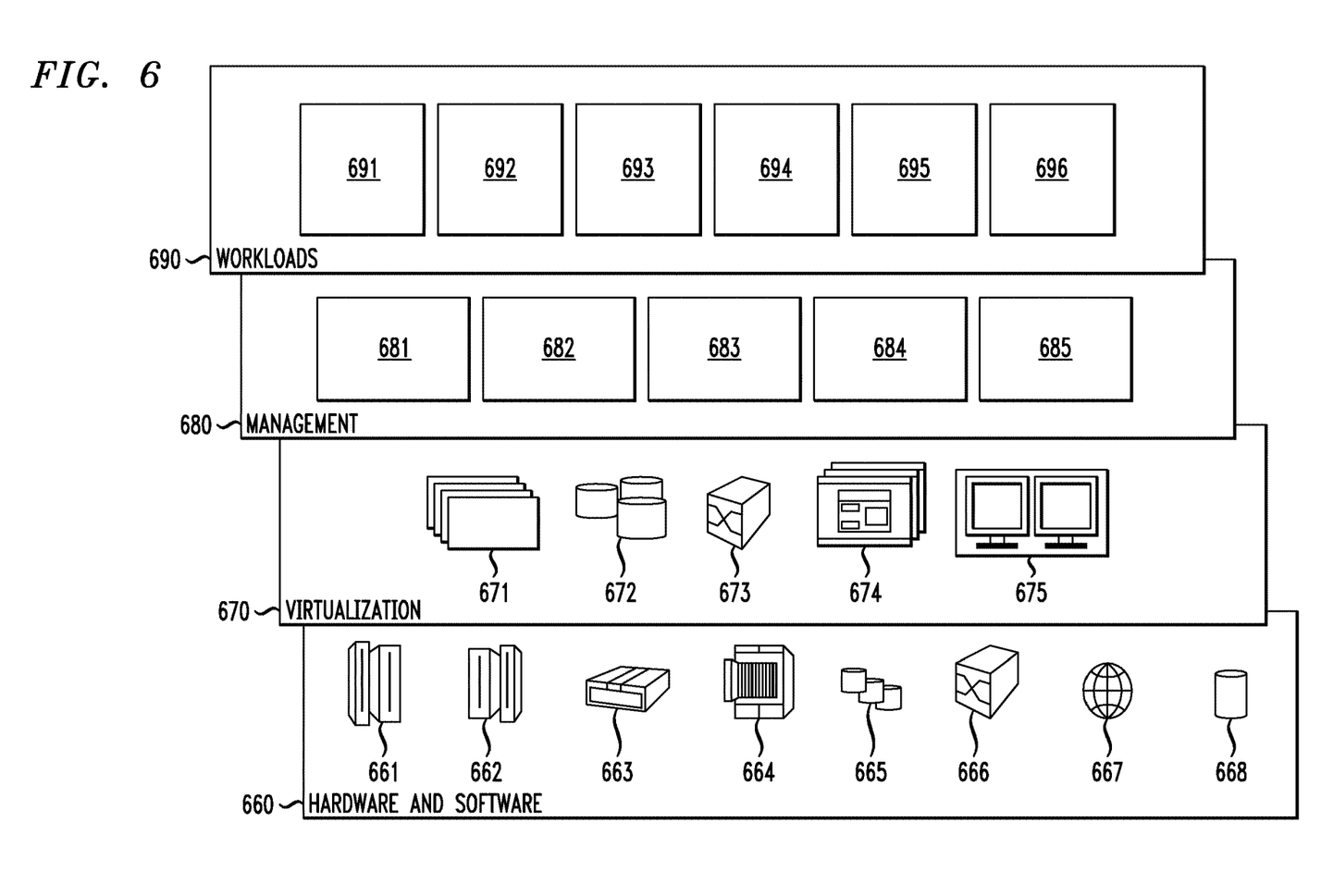
FIG. 6 depicts abstraction model layers, according to an embodiment of the invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; data capturing 693; data analytics processing 694; transaction processing 695; and route generation 696, which may perform one or more of the functions described above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    maintaining a database comprising data associated with one or more routes, wherein the data associated with the one or more routes comprises difficulty level data for utilizing one or more mobility assistive tools to traverse the one or more routes;
    in response to receiving a query from a given computing device, predicting, based at least in part on the difficulty level data, one or more amounts of physical exertion for a given user to traverse at least a portion of the one or more routes utilizing a given mobility assistive tool;
    responsive to the given user choosing a level of physical exertion, ranking the one or more routes based at least in part on the predicting of the one or more amounts of physical exertion;
    selecting one or more routes for the given user to traverse based at least in part on the ranking of the one or more routes and identifying the given mobility assistive tool associated with the level of physical exertion chosen by the given user; and
    estimating one or more contextual factors of the given user to at least one of coordinate and prioritize the selected one or more routes for the given user based on analyzing user data;
    wherein the difficulty level data is a result of an analysis of one or more geographic characteristics of the one or more routes, the one or more contextual factors of the given user and the given mobility assistive tool;
    wherein selecting the one or more routes further comprises:
    prioritizing the ranking of the one or more selected routes;
    selecting a user preferred interface for receiving the prioritized ranking of the one or more selected routes, comprising at least one of a graphical user interface of a user device, and a graphical user interface of a mobility assistive tool in the form of one or more of video and audio, wherein the given graphical user interface is an interactive graphical user interface displaying an accessibility map that is color coded to show the prioritized ranking of the one or more selected routes and one or more additional routes with difficulties based on the same and other mobility assistive tools;
    providing the given user with a mobility assistive tool recommendation to utilize a different mobility assistive tool than the given mobility assistive tool based on the level of physical exertion chosen by the given user utilizing the color coded accessibility map; and
    selecting the at least one route based on the prioritized ranking of the one or more routes and the mobility assistive tool recommendation;
    wherein the steps are implemented by at least one processing device comprising a processor operatively coupled to memory.

2. The method of claim 1, wherein the analysis of the one or more geographic characteristics of the one or more routes comprises, for each of the one or more routes, analyzing one or more of material composition, elevation, faults and weather conditions.

3. The method of claim 1, wherein the analysis of the one or more geographic characteristics and the one or more routes, for each of the one or more routes, is performed at least in part by one or more neural networks implemented by the at least one processing device.

4. The method of claim 1, wherein predicting of the one or more amounts of physical exertion for the given user further includes utilizing data associated with one or more goals of the given user.

5. The method of claim 1, wherein predicting of the one or more amounts of physical exertion for the given user further includes utilizing crowdsourced data comprising physical exertion data for one or more other users.

6. The method of claim 1, wherein identifying the given mobility assistive tool comprises utilizing one or more of a machine learning method and a signal processing method to analyze one or more device signal signatures while the given user is moving.

7. The method of claim 1, further comprising receiving feedback from the given user traversing a given route, and updating the difficulty level data for the given route in real-time or near real-time based on the received feedback.

8. An article of manufacture comprising a non-transitory processor- readable storage medium for storing processor-readable program code which, when executed, causes a processor to perform the steps of:
    maintaining a database comprising data associated with one or more routes, wherein the data associated with the one or more routes comprises difficulty level data for utilizing one or more mobility assistive tools to traverse the one or more routes;
    in response to receiving a query from a given computing device, predicting, based at least in part on the difficulty level data, one or more amounts of physical exertion for a given user to traverse at least a portion of the one or more routes utilizing a given mobility assistive tool;
    responsive to the given user choosing a level of physical exertion, ranking the one or more routes based at least in part on the predicting of the one or more amounts of physical exertion;
    selecting one or more routes for the given user to traverse based at least in part on the ranking of the one or more routes and identifying the given mobility assistive tool associated with the level of physical exertion chosen by the given user; and
    estimating one or more contextual factors of the given user to at least one of coordinate and prioritize the selected one or more routes for the given user based on analyzing user data;
    wherein the difficulty level data is a result of an analysis of one or more geographic characteristics of the one or more routes, the one or more contextual factors of the given user and the given mobility assistive tool;

wherein selecting the one or more routes further comprises:

prioritizing the ranking of the one or more selected routes;

selecting a user preferred interface for receiving the prioritized ranking of the one or more selected routes, comprising at least one of a graphical user interface of a user device, and a graphical user interface of a mobility assistive tool in the form of one or more of video and audio, wherein the given graphical user interface is an interactive graphical user interface displaying an accessibility map that is color coded to show the prioritized ranking of the one or more selected routes and one or more additional routes with difficulties based on the same and other mobility assistive tools;

providing the given user with a mobility assistive tool recommendation to utilize a different mobility assistive tool than the given mobility assistive tool based on the level of physical exertion chosen by the given user utilizing the color coded accessibility map; and selecting the at least one route based on the prioritized ranking of the one or more routes and the mobility assistive tool recommendation.

9. The article of manufacture of claim 8, wherein the processor-readable program code which, when executed, further causes the processor to perform the step of:

receiving feedback from the given user traversing a given route, and updating the difficulty level data for the given route in real-time or near real-time based on the received feedback.

10. The article of manufacture of claim 8, wherein predicting the one or more amounts of physical exertion for the given user further includes utilizing data associated with one or more goals of the given user.

11. The article of manufacture of claim 8, wherein predicting the one or more amounts of physical exertion for the given user further includes utilizing crowdsourced data comprising physical exertion data for one or more other users.

12. The article of manufacture of claim 8, wherein identifying the given mobility assistive tool comprises utilizing one or more of a machine learning method and a signal processing method to analyze one or more device signal signatures while the given user is moving.

13. The article of manufacture of claim 8, wherein the analysis of the one or more geographic characteristics and the one or more routes, for each of the one or more routes, is performed at least in part by one or more neural networks implemented by the at least one processing device.

14. A system comprising:

a data store configured to maintain a database comprising data associated with one or more routes, wherein the data associated with the one or more routes comprises difficulty level data for utilizing one or more mobility assistive tools to traverse the one or more routes; and at least one processing device operatively coupled to the data store;

wherein, in response to receipt of a query from a given computing device, the at least one processing device is configured to:

predict, based at least in part on the difficulty level data, one or more amounts of physical exertion for a given user to traverse at least a portion of the one or more routes utilizing a given mobility assistive tool;

responsive to the given user choosing a level of physical exertion, rank the one or more routes based at least in part on the predicting of the one or more amounts of physical exertion;

select one or more routes for the given user to traverse based at least in part on the ranking of the one or more routes and identifying the given mobility assistive tool associated with the level of physical exertion chosen by the given user; and estimate one or more contextual factors of the given user to at least one of coordinate and prioritize the selected one or more routes for the given user based on analyzing user data;

wherein the difficulty level data is a result of an analysis of one or more geographic characteristics of the one or more routes, the one or more contextual factors of the given user and the given mobility assistive tool;

wherein selecting the one or more routes further comprises:

prioritizing the ranking of the one or more selected routes;

selecting a user preferred interface for receiving the prioritized ranking of the one or more selected routes, comprising at least one of a graphical user interface of a user device, and a graphical user interface of a mobility assistive tool in the form of one or more of video and audio, wherein the given graphical user interface is an interactive graphical user interface displaying an accessibility map that is color coded to show the prioritized ranking of the one or more selected routes and one or more additional routes with difficulties based on the same and other mobility assistive tools;

providing the given user with a mobility assistive tool recommendation to utilize a different mobility assistive tool than the given mobility assistive tool based on the level of physical exertion chosen by the given user utilizing the color coded accessibility map; and selecting the at least one route based on the prioritized ranking of the one or more routes and the mobility assistive tool recommendation.

15. The system of claim 14, wherein, in the analysis of the one or more geographic characteristics of the one or more routes, the at least one processing device is configured to, for each of the one or more routes, analyze one or more of material composition, elevation, faults and weather conditions.

16. The system of claim 14, wherein the identification of the given mobility assistive tool comprises a utilization of one or more of a machine learning method and a signal processing method to analyze one or more device signal signatures while the given user is moving.

17. The system of claim 14, wherein one or more of crowd pressure and route familiarity are used to select the one or more routes.

18. The system of claim 14, wherein the analysis of the one or more geographic characteristics and the one or more routes, for each of the one or more routes, is performed at least in part by one or more neural networks implemented by the at least one processing device.

19. The system of claim 14, wherein predicting the one or more amounts of physical exertion for the given user further includes utilizing one of data associated with one or more goals of the given user and crowdsourced data comprising physical exertion data for one or more other users.

20. The system of claim 14, further comprising receiving feedback from the given user traversing a given route, and updating the difficulty level data for the given route in real-time or near real-time based on the received feedback.

\* \* \* \* \*